United States Patent
Kaufmann

(10) Patent No.: US 6,602,334 B1
(45) Date of Patent: Aug. 5, 2003

(54) METHOD AND INK FOR PRODUCING WATERPROOF MARKINGS ON PLASTIC SURFACES

(76) Inventor: Rainer Kaufmann, Schanzenstrasse 36, D-27753 Delmenhorst (DE)

(*) Notice: Subject to any disclaimer, the term of this patent is extended or adjusted under 35 U.S.C. 154(b) by 0 days.

(21) Appl. No.: 09/544,707

(22) Filed: Apr. 6, 2000

Related U.S. Application Data

(63) Continuation-in-part of application No. PCT/EP98/06271, filed on Oct. 2, 1998.

Foreign Application Priority Data

Oct. 6, 1997 (DE) .................................... 197 44 018

(51) Int. Cl.$^7$ ............................................... C09D 11/02
(52) U.S. Cl. ................................ 106/31.58; 106/31.43; 106/31.47
(58) Field of Search ........................ 106/31.58, 31.43, 106/31.49

(56) References Cited

U.S. PATENT DOCUMENTS

| | | | | | |
|---|---|---|---|---|---|
| 4,627,875 | A | * | 12/1986 | Kobayashi et al. | 106/31.49 |
| 5,006,172 | A | * | 4/1991 | Chieng et al. | 106/31.49 |
| 5,596,027 | A | * | 1/1997 | Mead et al. | 523/161 |
| 5,665,150 | A | * | 9/1997 | Schwarz | 106/31.43 |
| 5,667,569 | A | * | 9/1997 | Fujioka | 106/31.58 |
| 5,766,325 | A | * | 6/1998 | Gundlach et al. | 106/31.43 |
| 5,922,116 | A | * | 7/1999 | Mistry et al. | 106/31.47 |
| 6,344,497 | B1 | * | 2/2002 | Meyrick et al. | 523/160 |
| 6,444,019 | B1 | * | 9/2002 | Zou et al. | 106/31.4 |

* cited by examiner

Primary Examiner—Mark L. Bell
Assistant Examiner—Veronica F. Faison
(74) Attorney, Agent, or Firm—R W Becker & Associates; R W Becker

(57) ABSTRACT

An ink and a method are disclosed for producing waterproof- and smudge-proof markings and printing on plastic surfaces with an ink formulated to contain a low-volatile solvent with a vapor pressure of less than 20 mbar at 20° C. and a dye dissolved in the solvent which when applied to a plastic material surface absorbs the low-volatile solvent and embeds the dye into the plastic material.

5 Claims, 1 Drawing Sheet

METHOD AND INK FOR PRODUCING WATERPROOF MARKINGS ON PLASTIC SURFACES

CROSS-REFERENCES TO RELATED APPLICATIONS

This application claims the priority of German Patent Application Ser. No. 197 44 018.5 filed Oct. 6, 1997, and is a continuation-in-part application of PCT International Application Number PCT/EP98/06271 filed Oct. 2, 1998, the subject matter of which is incorporated herein by reference.

BACKGROUND OF THE INVENTION

The present invention relates to an ink, and in particular to a type of ink and a method applying the ink to plastic surfaces for use in markings and printing on surfaces of plastic material.

There is extensive need in many technical fields, and in particular also in the field of graphics and graphic design to produce markings on surfaces such as, for example, printing on various types of surfaces ink and the need that such print is waterproof and durable. Accordingly, it is desirable to produce such markings with an ink that fulfills this need.

In this context, computer generated or computer aided printing has gained much ground and has gained more and more importance. In particular, ink jet printers are suitable for such printing purposes because they are flexible in application and they are economical in use.

In general, the function of ink jet printers is based on the ink jet method, whereby ink droplets that are generated within a jet head are expelled with high speed under pressure and are directed at the substrate to be printed. The preferred inks for this purpose are substantially water based and contain a dye or dye stuff, which is soluble in water. When using the afore-mentioned type ink, a problem arises in the production of, for example, presentation graphics, where transparent foils are being printed on. Transparent foils of the type with a very smooth surface, which is indicated by a shiny gloss, cannot be printed since the ink jet printing process produces unsatisfactory results, in that the ink droplets are unable to wet the surface of the foil. In order to circumvent this problem in such a case, foils must be used that have been treated in such a way that their surface is napped or coated for the ink to adhere and before the surface can be wetted by the ink. Needless to say, such treated foils are very expensive, as their production requires the additional steps of coating or napping.

Inks of a conventional type, such as those that are found, for example, in permanent markers have not proven useful for producing water-proof markings or prints by means of an ink jet printer. The failure to obtain a satisfactory result with such an ink in a printing process is due, for example, to the lack of adequate surface tension of the ink solution and in addition, is also due to rapid evaporation of the ink solvent at the ink jets thereby causing the ink to dry and thus causing clogging of the ink jets. Inks that are pigment-based are likewise not suitable, since fixation of the pigment to plastic surfaces requires high amounts of binding agents which likewise leads to rapid drying out of ink at the jets. On the other hand, use of inks which are formulated to have a lower volatility for the purpose of preventing the drying out, can lead to much longer drying times of the printing or markings at the plastic surfaces.

DISCUSSION OF THE PRIOR ART

In the prior art, solutions to the afore-mentioned problems have been proposed. EP 0 413 4442 B1 relates to an ink for producing markings on plastic material which is used in an ink jet printer. The ink is a homogenous solution of 1 to 10 percent by weight dye, 1 to 25 percent of a "jet agent", for example water and/or an organic solvent with a boiling point in the range of 50° C. to 200° C. and additionally an organic solvent which slightly dissolves the surface of the plastic material or which penetrates the surface of the plastic material, and which is also a solvent for the dye. One criteria of the afore-mentioned ink is that it has only a maximum water content of 25%. However, a water content higher than 10 percent, impacts already negatively on the properties of the ink. Thus ink jet heads must be manufactured from high quality plastic, otherwise there is the danger that the ink jet heads themselves are dissolved by the ink solution.

EP 0148 615 A1 discloses an ink for producing markings on transparent foils which contains a dye in a solvent which sufficiently dissolves the dye and which does not negatively impact, i. e. not dissolve, the surface of the medium when it absorbs the ink. The boiling point of the solvent is above 150° C. in order to realize a capacity for extended storage. This ink is particularly suited for composite media, which are liquid absorbing and that are comprised of a liquid absorbing bottom layer and a liquid absorbing top layer, and wherein the absorbing capacity of the bottom layer is greater than that of the top layer. The ink contains preferably 10 to 20 percent dyestuff and 75 to 90 percent solvent.

EP 0 070 504 A2 discloses an ink for writing or marking on substrates made from heavily sized papers or foils, which consists of a solvent and a dye dissolved therein, and wherein the ink slightly dissolves the sizing or plastic and that after rapid drying, a smudge-free written image is rendered.

U.S. Pat. No. 3,973,058 discloses an ink for printing on resin foils of the type as used for laminated security glass. The ink contains 12 to 35 percent by weight dye which is dissolved within a N-alkyl-pyrrolidone based solvent.

However, the foregoing prior art has not solved the problems, which are the object of the present invention.

SUMMARY OF THE INVENTION

It is thus an object of the present invention to provide an improved method and an ink to produce markings on plastic surfaces, obviating the afore-stated drawbacks.

In particular, it is an object of the present invention to provide an improved ink, which is inexpensive to produce, and which can be used for printing and producing markings on conventional plastic surfaces including those that have smooth glossy surfaces such as for example certain plastic foils. Such plastic foils may be made, for example, from soft PVC or cellulose acetate, which can be used for printing on them, or on which markings can be made and which are rendered smudge-proof after printing or applying markings on them.

It is a further object of the present invention to provide ink, which can be used with conventional ink jet printers.

These objects, and others which will become apparent hereinafter, are attained in accordance with the present invention by providing an ink formulated for producing water-proof markings on plastic surfaces, in particular also PVC plastics, and which comprises a volatile base liquid, a low-volatile solvent having a vapor pressure of less than 20 mbar at 20° C. and capable of being absorbed by the plastic material, and a dye dissolved in a mixture of the base liquid and the low-volatile solvent, and wherein the content of the low-volatile solvent is less than 50 percent by weight.

In accordance with the ink of the present invention, the ink can be formulated in a rather inexpensive way when it contains less than 50 percent volatile solvent and when the remaining liquid portion of the ink is, for example, water. Since the ink formulation uses a relatively high portion of water, the ink does not exhibit any dissolving activity on the ink jet heads and therefore does not negatively impact on the ink jet heads that are made from plastic and therefore the heads last longer. Furthermore, due to the high vapor pressure of water in the formulated ink, overheating of the ink jet printer, which operates according to the bubble jet principle, is prevented. A drying up of the ink at the jets is likewise prevented.

It is a further feature of the ink according to the invention, that the ink contains base liquids, which liquids are volatile. Such an ink may contain water as a volatile base liquid. Other such liquids are alcohols, ethers, ketones, esters, or mixtures thereof.

Significantly, it has been found that with the ink according to the invention, which may be formulated to contain more than 40 percent water, excellent, durable, smudge-proof and water-proof markings are produced on foils which are from soft PVC or cellulose acetate foils, the use of which is quite cost-efficient.

It is yet a further feature of the ink according to the invention that the ink may be formulated with low-volatile solvent. Solvents of this type are methyl pyrrolidone, ethylene carbonate, propyl carbonate, a carbonic acid ester, one of either a diol or triol of a hydrocarbon, a glycol, a ketone, an ether, an alcohol, a formamide, an alkane, a lactane or their derivatives and co-polymers.

When applying the ink to the surface of the plastic material the base liquid evaporates rapidly and the plastic material absorbs the low-volatile solvent, and/or the plastic material surface somewhat dissolves due to the presence of the low-volatile solvent. Thus, the dyestuff, which is dissolved in the solvent, can penetrate the surface of the plastic material and is thereby absorbed by the material in such a way as to render the markings so made smudge-proof and waterproof. It has been demonstrated that the solvent essentially penetrates the plastic material due to its property of low-volatility, and that the ink dries in the penetration process rather than by evaporation of the solvent in the surrounding air thereby causing drying of the ink. As a result of the former process, the dye is actually being embedded into the plastic material and not simply deposited at the top of the plastic surface. A deposition at the surface of the plastic material could also not bring about a satisfactory result with respect to the markings being smudge-proof and waterproof. Embedding the dye into the plastic material itself also leads to a very durable end product, which is stabilized against all types of materials except those that have dissolving properties.

In accordance with another feature of the invention, certain plastics and their foils, respectively the surfaces of such foils, are particularly well suited for producing markings or printing on them. Especially suitable as plastic materials are for example soft PVC, cellulose acetate, polyvinylchloride, soft polyvinyl chloride, polystyrol, polyacrylate, polyamide, polycarbonate resin, polysulfone, and their derivatives and copolymers.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1A:
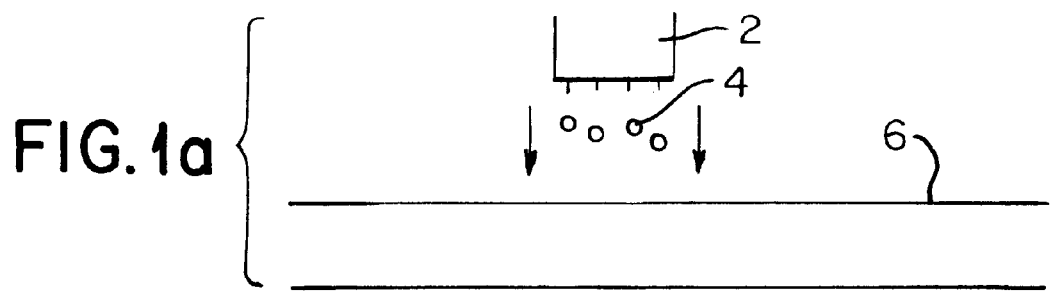
FIGS. 1a–d shows a schematic representations of the method steps according to the present invention where the ink is deposited by way of an ink jet printer (not shown) onto a plastic surface.

Throughout all the Figures, same or corresponding elements are generally indicated by same reference numerals.

Figure 1B:
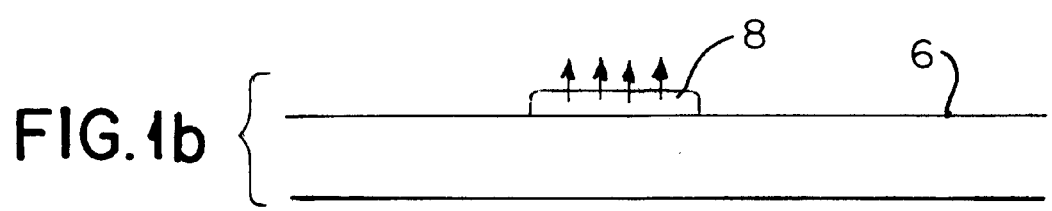
Figure 1C:
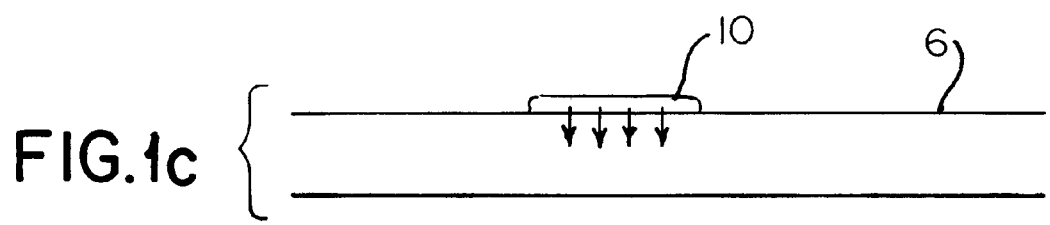
Figure 1D:
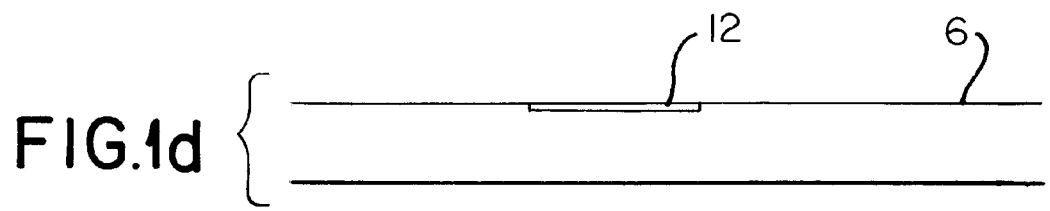

Turning now to FIG. 1, there is shown a series of steps a) though d) in which in step a) the ink droplets 4, by means of a conventional ink jet head 2, are sprayed or spray dispersed in the direction of foil 6. The droplets 4, which hit foil 6, form an ink layer 8, which layer is thereby coating and/or wetting a predetermined area of the foil. Significantly, the dye of the ink is dissolved in the solvent. The coating or wetting may be enhanced with certain additives, which are available for this purpose and which have surface-active characteristics.

Due to its lighter volatility, the base liquid evaporates as shown in step b) and after a short period of time, the low-volatile solvent with the dye remains (layer 10). The low-volatile solvent penetrates into the plastic surface after the low-volatile solvent has partially dissolved a top layer of the plastic surface. Since the dye is also soluble within the low-volatile solvent, the dye is transported into the plastic material during the dissolving by the low-volatile solvent as depicted in step c) and embedded therein. Shown in Step d) is the resulting foil 6 showing the wetted dye layer 12 embedded into the plastic material. A complete high-quality color image remains that is mechanically stable and waterproof.

EXAMPLE 1

A preferred formulation of an ink according to the invention and formulated for the surfaces of cellulose acetate or soft PVC (all measures given in weight percent)

10–50% solvent of low volatility, for example, methyl pyrrolidone and/or di-ethyleneglycolmonoethylether.

1–20% solvent-dye 0.01–5% wetting agent or surfactants and/or preservatives (e.g. phenol containing agent as bactericide.

and wherein 100% volatile base liquid contains at least one of water, alcohol, ether, ketone, ester.

EXAMPLE 2

Good results are attained with the following formulation of an ink.

15% methyl pyrrolidone,

15% di-ethyleneglycolmonoethylether

5% dye Cl Solvent Black 29

<5% wetting agent or surfactant and preservatives

15% ethanol and wherein 100% of the volatile base liquid is water

Instead of Solvent Black 29 other solvent dyes may also be employed. For example, solvent blue 129, solvent red 8, solvent yellow 79.

While the invention has been illustrated and described as embodied in an ink for producing markings and for printing on plastic surfaces, it is not intended to be limited to the details shown since various modifications and structural changes may be made without departing in any way from the spirit of the present invention.

What is claimed is:

1. An ink solution for producing waterproof markings on a surface of plastic material, comprising:

a volatile base liquid;

a low-volatile solvent having a vapor pressure of less than 20 mbar at 20° C. and capable of being absorbed by the plastic material, and a solvent dye soluble in the low-volatile solvent, wherein the content of the low-volatile solvent is less than 50 percent by weight and the content of the volatile base liquid is more than 40% by weight.

2. The ink solution of claim 1, wherein the volatile base liquid is selected from the group consisting of water, an alcohol, an ether, a ketone, an ester or a mixture thereof.

3. The ink solution of claim 1, wherein the volatile base liquid is water.

4. The ink solution of claim 1, wherein the low-volatile solvent is selected from the group consisting of methyl pyrrolidone, ethyl carbonate, propylcarbonate, a carbonic acid ester, one of either a diol or triol of a hydrocarbon, a glycol, a ketone, an ether, an alcohol, a formamide, an alkane, a lactane or their derivatives and co-polymers.

5. A method of printing using ink solution comprising a volatile base liquid; a low-volatile solvent having a vapor pressure of less than 20 mbar at 20° C. and capable of being absorbed by the plastic material, and a solvent dye soluble in the low-volatile solvent, wherein the content of the low-volatile solvent is less than 50 percent by weight and the content of the volatile base liquid is more than 40% by weight, comprising the step of marking the surface of a plastic selected from the group consisting of cellulose acetate, polyvinyl chloride, polystyrene, polyacrylate, polyamide, polycarbonate, polysulfone, and their derivatives and copolymers.

* * * * *